Sept. 7, 1926.
D. J. A. NICOLAS
1,599,396
HAY HARVESTER AND DISCHARGER
Filed April 19, 1926
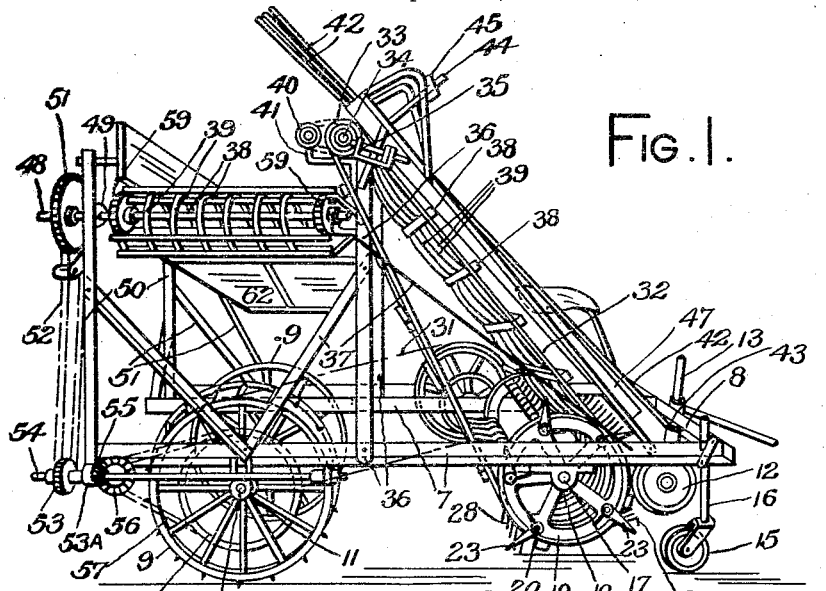
Fig. 1.
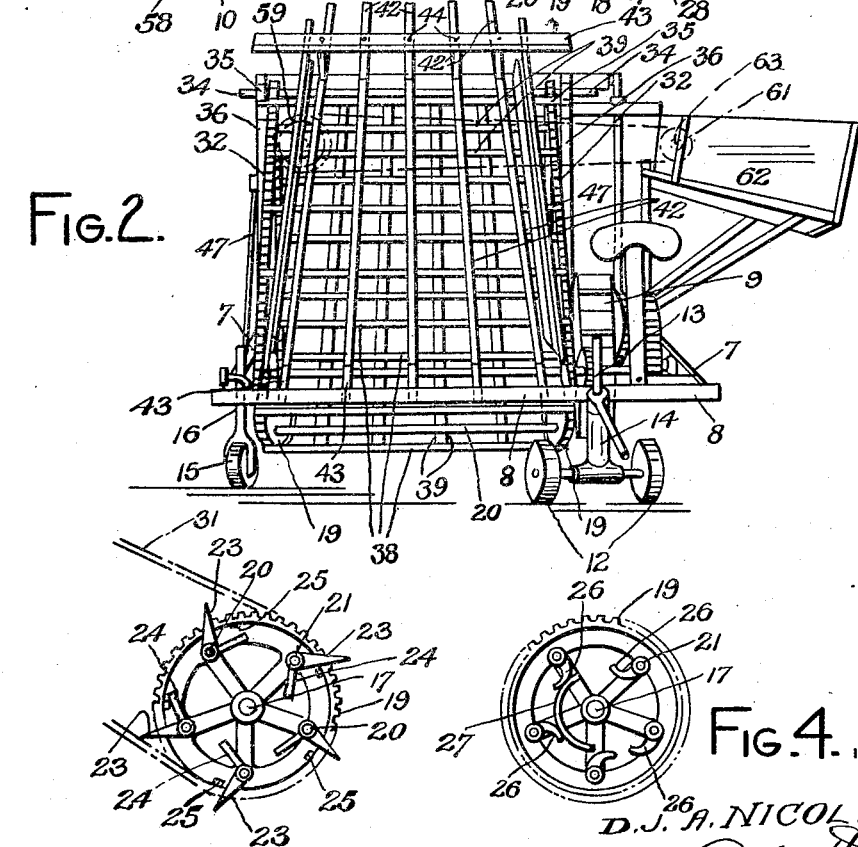
Fig. 2.
Fig. 3.
Fig. 4.
INVENTOR
D. J. A. NICOLAS
By *[signature]* ATTORNEY Patented Sept. 7, 1926.

1,599,396

UNITED STATES PATENT OFFICE.

DANIEL JOSEPH ALBERT NICOLAS, OF CHAMPSAUR, FORBES, NEW SOUTH WALES, AUSTRALIA.

HAY HARVESTER AND DISCHARGER.

Application filed April 19, 1926, Serial No. 103,163, and in Australia February 11, 1925.

Heretofore in the harvesting and baling of hay the gathering and supplying the hay into a press has consumed an inordinate amount of time and this adding considerably to the cost of production. And even when a travelling press is in use this disadvantage is present.

This invention has however been specially devised to provide an improved combined hay harvester and bale press feeder that may be travelled over mown hay and specifically with the bale press so that the hay is gathered and in the latter case baled at the same time and thereby considerably expediting the harvesting and at the same time dispensing with considerable manual labor and cheapening the cost of baled hay.

This improved combined hay harvester and bale press feeder has a structure supported on a frame with a clevis headed pilot wheel and a land wheel in front and draught wheels with a live axle at rear. Forwardly supported by the frame is a horizontal picker up or cylindrical framing having in its circumference at set points a plurality of longitudinal radially moving rakes oscillated by cams at arbitrary radial points of the revolution of the cage. An endless chain elevator travels round said cage and around idler pulleys adjustably fast to a vertical structure on the frame. On or above the lifting face of the elevator is a resiliently held press guard adapted to accommodate to any reasonably variable load on the elevator. A transverse chute at the discharge end of the elevator carries a moving apron or discharge carrier of similar construction to that of the mentioned elevator positioned and has a discharge end the height of which coincides and is adapted to juxtapose with the feed end or platform of a bale press coupled to this harvester or to deliver otherwise.

But in order that this invention may be readily carried into practical effect the same will now be described with reference to the drawings all of which are more or less schematic accompanying and forming part of this complete specification.

Figs. 1 and 2 are perspective views of this improved combined hay harvester and bale press feeder at the side and at the front respectively and Figs. 3 and 4 are side elevations respectively of the outer faces of the near and off wheel sprockets for the drive chains of the revolving hay picker-up.

This improved combined hay harvester and bale press feeder has main frame of longitudinal angle iron members 7 connected by cross member 8 at front and suitably braced and stayed by cross members or otherwise (not shown) at other points as desired. This front end is supported by pilot wheel or wheels 12 on stem 13 vertically adjustably held in bracket 14 fast to member 8 and with preferably a clevis head and is further supported by a land wheel 15 with stem 16 and adjustably clipped to near side member 7. The frame rear end is supported upon draught wheels 9 (preferably having spiked or ribbed treads or tyres) on fast axle 10 in brackets 11 bolted or clipped to side members 7.

Near the front under the frame is a transverse shaft 17 in bearings 18 bolted or otherwise fast to side members 7 and inwardly of said bearings 18 are keyed sprockets 19. Between the respective sprockets 19 and protruding outwardly thereof and having bearings therein are free spindles 20 forming the skeleton of the cage and having on each end collars 21 (see Fig. 3).

The collars 21 on the near sprocket 19 have each a fast pointed crank 23 with a tail pin or stop 24 adapted to meet a stop or lug 25 on the rim of sprocket 19. The off sprocket collars 21 have each a fast cam 26 (see Fig. 4) whose respective weight adapts it to ride against a fixed arcuate track 27 (which is an arc of about one third of a circle) bracketed to the side member 7. Each spindle 20 has forks or rakes 28 or series of same fast to them at intervals so as to form a drum or hay picker up which is adapted to be revolved by sprocket (not seen) on shaft 17 and ordinary speed gears (Fig. 1) by means of endless chain 31 from a sprocket (with operating clutch as ordinarily) on the rear draught revolving axle 10.

An inclined elevator constituted of an endless carrier belt 32 of spaced cords or chains 39 and of spaced transverse battens 38 passes around each of the picker up sprockets 19 and over sprockets 33 on a shaft 34 in bearings 35 fast to the top of standards 36 from the frame members 7 and adjustable as to distance or belt tension by a tension screw and which standards 36 have struts or stays 37 and which belting is between two inclined sides or frames 47 fixed and supported at members 7 and at tops of standards 36. At the discharge end of this elevator and rearwardly thereof is a guide roller 40 in bearings 41 bracketed from standards 36.

Between sides 47 and just above the inclined elevator belt 32—39 is a press guard for assisting in the elevation of the hay thrown against it to around said belt. This press guard comprises inclined gravity rods 42 and may be slightly resilient each at front and bottom having spring connecting piece 43 attaching it to cross member 8 (see Fig. 2) and each at top and rear having an offset 44 inserted free to move therein through a guiding orifice in a transverse member 45 secured to sides 47.

At the discharge end and rearwardly of the elevator 32—39 is a moving apron or discharge carrier travelling transversely from the discharge end of said elevator to one side preferably and as shown to the near side of the harvester and which carrier is on a chute 62 supported by standards 36 and posts 50 the latter having struts 51 and the discharge of said chute 62 juxtaposes the feed door of the bale press (not shown) or meets a feeding platform of the same. A longitudinal shaft 48 is in bearings 49 on the off one of the rear posts 50 and the off standard 36. The outer or rear end of the said shaft 48 has a sprocket 51 thereon around which is chain 52 which latter is also around a sprocket 53 on intermediate shaft 54 in bearings 53A on member 7 which shaft 54 is revolved by pinion 55 engaging bevel 56 on stub shaft bearing in member 7 and revolved by endless chain 57 around a sprocket on said stub shaft and around sprocket 58 fast on draught axle 10 fast of draught wheel 9. Inwardly of the sprocket 51 the shaft 48 has two separated or side sprockets 59 for endless chains 60 around other sprockets 61 (see Fig. 2) fast on a shaft 63 in bearing brackets on the discharge end of said chute 62 and these chains have spaced belting and transverse battens 38 similar to those of the elevator 32—39.

In use the harvester is attached by coupling or bolting or otherwise fastening the frames thereof together to a bale press of ordinary construction (not shown) with the discharge of chute 62 connecting with the feed orifice or feed platform of said press and the pilot wheels 12 and land wheel 15 are adjusted as to height so that the rakes 28 may easily pick up mown hay off the ground. As the hay harvester with the bale press is drawn or travelled over the ground by draught animals or other power the sprocket (or belt chain 31) on draught axle 9 revolves the gears 19 and so the picker up cage revolves the spindles 20 with fork or rakes 28. The depending prongs 24 will engage the ground as the harvester is drawn along to hold the rake teeth 28 momentarily in raking position immediately prior to the turning up of said teeth. Each spindle 20 travelling in a circular path is oscillated as each cam 26 engages the arcuate track 27 (beginning as the spindle 20 leaves its lowermost point near the ground) and causing said forks or rakes 28 to turn upwardly with the cut hay gathered or picked up by them and so on in turn each set of rakes 28 being kept engaged with its pick up until said cam 26 disengages its track 27 and travelling forwardly approaches the elevator 32—39 its load of hay is thrust into the belting carrying battens 38 under press guard 42 and said forks or rakes 28 fall forwardly by gravity as they pass the vertical axial point as far as allowed by the cranks 23 abutting the stops 25 on the rim of near sprocket 19. The press guard rods 42 are normally pressed down upon the load travelling along the elevator 32—39 by its connecting spring pieces 43 and accommodate to any reasonably variable load and so prevent it falling off. And the ropes or chains 39 also accommodate themselves to some extent to the varying thickness of the load owing to their flexibility.

When the hay reaches the end of elevator 32—39 it passes over the guide roller 40 onto the transverse moving discharge carrier in the chute 62 from end of which it falls onto the bale press platform or may be elsewhere.

I claim:—

A hay harvester and discharger comprising a wheeled frame, a rearwardly extending conveyor at the forward end thereof, a laterally extending conveyor adjacent to and below the top of said first mentioned conveyor, a rotary rake frame concentric with said rearwardly extending conveyor, means disposed annularly about said frame for operating said conveyors and frame, said rake frame comprising a plurality of transverse swivelly mounted rake carrying shafts, outwardly extending fingers at one end of said shafts and inwardly extending fingers at the opposite ends of said shafts, a fixed cam for engaging said inwardly extending fingers in sequence to position said rakes in loading position, spaced abutments at the opposite end of said frame adapted to limit the movement of said rakes when in inoperative position after the dead center of rotation is reached, and depending prongs on the last mentioned ends of said shafts for momentarily holding said rakes in raking position.

In testimony whereof I have signed my name to this specification.

DANIEL JOSEPH ALBERT NICOLAS.